United States Patent
Falk

(10) Patent No.: US 7,944,392 B2
(45) Date of Patent: May 17, 2011

(54) RADAR RECEIVER AND A METHOD FOR PROCESSING RADAR RETURNS

(75) Inventor: Kent Falk, Göteborg (SE)

(73) Assignee: SAAB AB, Linköping (SE)

( * ) Notice: Subject to any disclaimer, the term of this patent is extended or adjusted under 35 U.S.C. 154(b) by 6 days.

(21) Appl. No.: 12/409,898

(22) Filed: Mar. 24, 2009

(65) Prior Publication Data

US 2009/0295623 A1    Dec. 3, 2009

(30) Foreign Application Priority Data

Jun. 3, 2008    (EP) .................................... 08157457

(51) Int. Cl.
*G01S 13/00*    (2006.01)
(52) U.S. Cl. ........ 342/195; 342/104; 342/109; 342/118; 342/192
(58) Field of Classification Search ............ 342/109
See application file for complete search history.

(56) References Cited

U.S. PATENT DOCUMENTS 6,420,995 B1 *   7/2002  Richmond et al. ............... 342/45
2007/0247351 A1 *  10/2007  Falk .............................. 342/109

OTHER PUBLICATIONS

Lukin, K.A. "Noise Radar Technology" (Original published in Radiophysics and Electronics, vol. 4, No. 3, 1999, pp. 105-111), Telecommunications and Radio Engineering, 55(12), 2001.

European Patent Office Search Report, dated Dec. 19, 2008, issued in connection with Counterpart Application No. 08157457.6—1248.
Konstantin A. Lukin, et al., "Sampling Rate Reduction in Software Noise Radar," *International Radar Symposium, IRS 2006, IEEE*, pp. 1-4, May 21, 2008.
Konstantin A. Lukin, "Noise Radar Technology: The Principles and Short Overview," *Applied Radio Electronics*, vol. 4, No. 1, pp. 9-10.
Konstantin A. Lukin, "Millimeter Wave Noise Radar Applications: Theory and Experiment," *MSMW 2001 Symposium Proceedings*, Kharkov, Ukraine, pp. 68-73, Jun. 4-9, 2001.
James Tsui, "Fourier Transform-Related Operations," *Digital Techniques for Wideband Receivers*, Second Edition, pp. 131-134.
The First International Workshop on the Noise Radar Technology Proceedings, NRTW 2002, Yalta, Crimea, Ukraine, Sep. 18-20, 2002.

* cited by examiner

*Primary Examiner* — Thomas H Tarcza
*Assistant Examiner* — Timothy A Brainard
(74) *Attorney, Agent, or Firm* — Venable LLP; Eric J. Franklin

(57) ABSTRACT

A method for processing received radar returns of a radiated wide-band arbitrary waveform in a wide-band radar processing system using spectral processing. The received wide-band radar returns are undersampled by using a first sampling rate to obtain an undersampled digital wide-band radar waveform. Spectral processing is performed on the power spectrum of the undersampled digital wide-band radar waveform in order to obtain a discrete ripple frequency power spectrum of the undersampled digital wide-band radar waveform. Ripple frequencies indicating radar targets are located in the discrete ripple frequency power spectrum of the undersampled digital wide-band radar waveform. A radar receiver, a digital wide-band radar processing system and a computer program product.

14 Claims, 9 Drawing Sheets

RADAR RECEIVER AND A METHOD FOR PROCESSING RADAR RETURNS

CROSS-REFERENCE TO RELATED APPLICATIONS

This application claims priority to European patent application 08157457.6 filed 3 Jun. 2008.

TECHNICAL FIELD

The present invention relates to radar processing systems in general, and in particular to a radar system for processing radar returns using arbitrary waveforms in combination with spectral processing. The present invention also relates to a method for processing radar returns using arbitrary waveforms in combination with spectral processing.

BACKGROUND

Recently, there has been considerable interest in radar processing systems using arbitrary, both deterministic and non-deterministic, waveforms over a wide spectrum of applications, such as through wall surveillance, detection, tracking, Doppler estimation, polarimetry, interferometry, ground-penetrating or subsurface profiling, synthetic aperture radar (SAR) imaging, inverse synthetic aperture radar (ISAR) imaging, foliage penetration imaging, etc. This is because of that the technology for the generation of arbitrary waveforms has matured by the introduction of digitally controlled waveform generators. One of the major advantages of using arbitrary waveforms is its inherent immunity from jamming, detection, and external interference.

A noise radar, which is an example of a radar using arbitrary waveforms, is a form of random waveform radar whose transmitting waveform is a microwave noise source or is modulated by a lower frequency white noise source in contrast to the conventional pulse, CW (continuous wave), FM (frequency modulated), or FM/CW radars. Because of the truly random or pseudo random transmitting waveform, noise radars have many advantages compared with conventional radars, including unambiguous measurement of range and Doppler estimations, high immunity to noise, very low probability of intercept (LPI), high electro-magnetic compatibility, good electronic counter countermeasure (ECCM) capability, good counter electronic support measure (CESM) capability, and ideal 'thumbtack' ambiguity function.

However, despite these many advantages the research on radar processing systems using arbitrary waveforms has shown very little progress, since it was first suggested and researched upon in the 1960's. An existing problem with the implementation of radar processing systems using arbitrary waveforms is still, the limited availability and the cost of suitable electronic components capable of handling the high computational loads.

OBJECT OF THE INVENTION

It is an object of the present invention to provide a digital radar processing system capable of processing wide-band arbitrary waveforms.

SUMMARY

The object of the present invention is achieved by a method for processing received radar returns of a radiated wide-band arbitrary waveform in a wide-band radar processing system using spectral processing. The method is characterized by the steps of: undersampling said received wide-band radar returns by using a first sampling rate to obtain an undersampled digital wide-band radar waveform; performing spectral processing on the power spectrum of said undersampled digital wide-band radar waveform in order to obtain a discrete ripple frequency power spectrum of said undersampled digital wide-band radar waveform; and locating, in said discrete ripple frequency power spectrum of said undersampled digital wide-band radar waveform, ripple frequencies indicating radar targets.

An advantage of the above described invention is that the present invention is that it provides less computational load, and thus less computationally heavy processing of the wide-band radar return waveforms in a digital wide-band radar processing system. This allows the use of a considerably larger bandwidth of the radiated arbitrary waveform.

A further advantage of the above described invention is that is enables the use of digital wide-band radar processing systems in many new areas of application by utilizing less expensive components and components that are more suitable for implementation in an actual application. This may be performed without substantially reducing the performance or affecting the result of the digital wide-band radar processing system.

An advantage of the above described invention is that is enables the use of a wider band of frequencies to be use in the received radar returns as compared to the known prior art. This feature enables a digital wide-band radar processing system that has less chance of being detected during operation.

A further advantage of the above described invention is that it may use the antenna leakage between the transmitter and the receiver as a coupling between the transmitter and the receiver. The spectral processing of the present invention advantageously uses this mixture of the transmitted and received waveform, which is the cause of said ripple frequencies in the power spectrum, in order to identify said radar targets.

The object of the present invention is further achieved by the first sampling rate being determined such that it is below a second sampling rate, wherein said second sampling rate is the sampling rate required by the wide-band radar returns in order to fulfill the Nyquist criteria, and such that a folding factor present in said discrete ripple frequency power spectrum of said undersampled digital wide-band radar return waveform is stable, so that said ripple frequencies may be located in said discrete ripple frequency power spectrum of said undersampled digital wide-band radar return waveform.

This feature enables the present invention to heavily undersample the received radar returns of the radiated wide-band waveform without seriously affecting the ripple frequency characteristics. Thus, the feature enables the present invention to, from the heavily undersampled digital wide-band radar returns, locate the ripple frequencies and extract radar critical information. This may be performed without reducing the performance or seriously affecting the end result of the digital wide-band radar processing system.

The object of the present invention is further achieved by a radar receiver for processing radar returns in a wide-band radar processing system using spectral processing. The radar receiver comprising receiving means arranged to receive radar returns of wide-band arbitrary waveforms radiated by a transmitter. The radar receiver is characterized by at least one analog to digital converter operating at a first sampling rate arranged to undersample received wide-band radar returns in order to obtain an undersampled digital waveform; and processing means arranged to perform spectral processing on the power spectrum of said undersampled digital wide-band radar waveform in order to obtain a discrete ripple frequency power spectrum of said undersampled digital wide-band radar waveform; and locate, in said discrete ripple frequency power spectrum of said undersampled digital wide-band radar waveform, ripple frequencies indicating radar targets.

The object of the present invention is further achieved by a digital wide-band radar processing system comprising a radar receiver according to the above.

The object of the present invention is further achieved by a computer program product for use in a radar receiver. The computer program product comprising computer readable code means, which when run in the radar receiver causes said radar receiver to perform the steps of: performing spectral processing on the power spectrum of said undersampled digital wide-band radar waveform in order to obtain a discrete ripple frequency power spectrum of said undersampled digital wide-band radar waveform; and locating, in said discrete ripple frequency power spectrum of said undersampled digital wide-band radar waveform, ripple frequencies indicating radar targets.

The computer program product performing the steps mentioned above may be implemented using a dedicated hardware product, such as, for example, a field-programmable gate array (FPGA) or the like.

Further advantageous embodiments of the methods, the mobile terminal, the network node and the mobile radio communication system are set forth below, which correspondently describes further advantageous embodiments of the present invention.

BRIEF DESCRIPTION OF THE DRAWINGS

The present invention will be described in more detail in the following, with reference to the appended drawings, in which.

DETAILED DESCRIPTION

Figure 1:
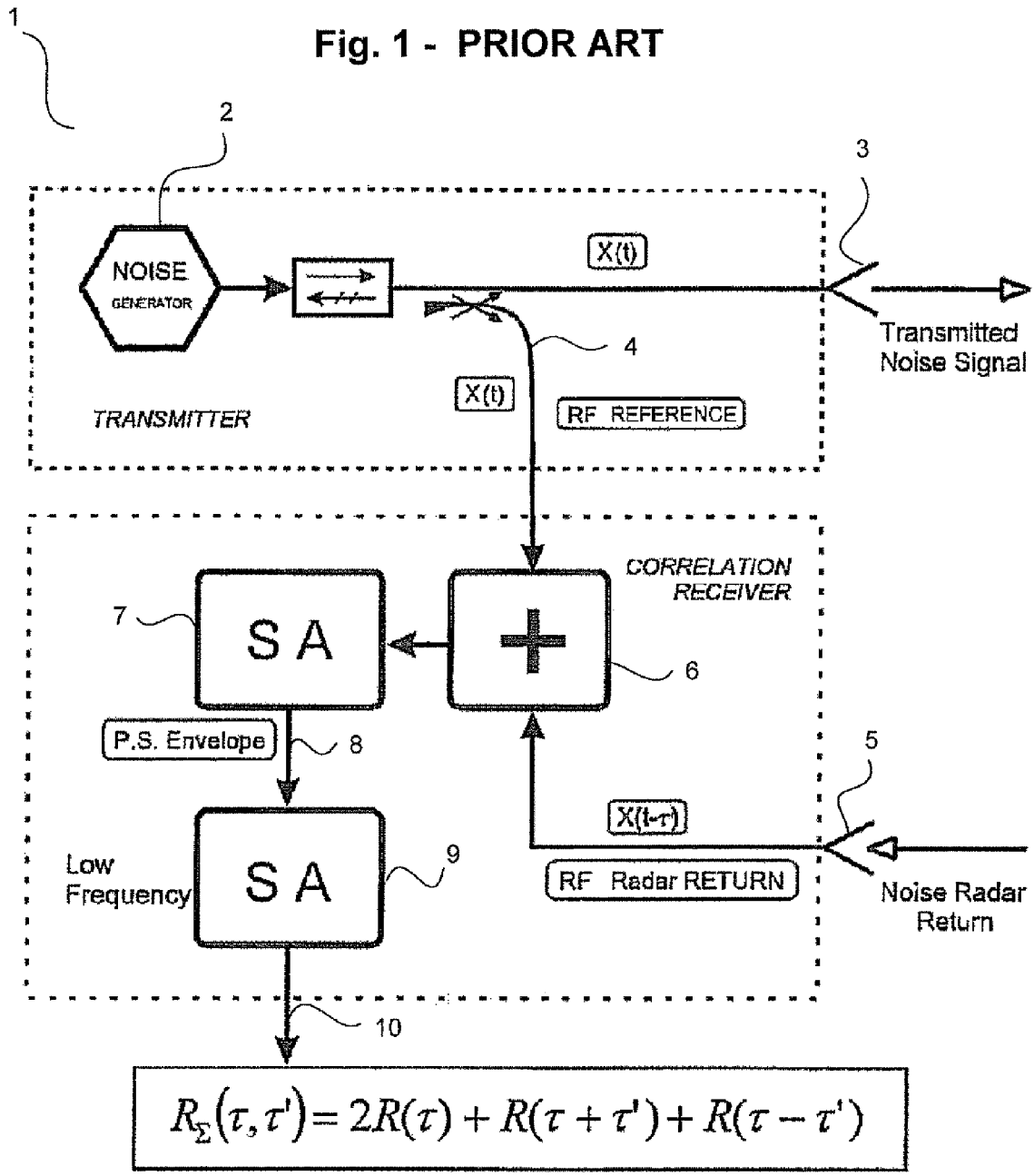
FIG. 1 is a block diagram of analogue noise radar processing using spectral processing according to prior art.

FIG. 1 is a block diagram of analogue noise radar processing using double spectral processing according to prior art. The analogue noise radar processing is described in "The principals of noise radar technology", The first International Workshop on the Noise Radar Technology, NRTW 2002 Proceedings, pp. 13-22, 18-20 September, Yalta, Crimea, Ukraine.

A continuous noise waveform is generated in the analogue noise radar 1 by the noise generator 2 and is radiated by the transmit antenna 3, while the waveform taken via directional coupler 4 serves as a reference.

The radar returns received by the receiving antenna 5 and the reference are summed first at the summer 6 and after that the spectrum of the total waveform is passed into a first spectrum analyzer 7. If the round trip propagation time $\tau=2R/c$ of the waveform is much longer of its correlation decay time, $\tau_c$, the power spectral density will get a periodic modulation with a frequency period inversely proportional to the doubled distance to the target: $T_f=c/2R$. The envelope of the power spectrum density is a "time function", and is taken at a "video" output 8 and fed into a second spectrum analyzer 9. This results in a single spectral line (for a single target), the value of which is reciprocal of $T_f$ and proportional to the double distance to the target. In the case of multiple targets, the secondary power spectrum will have corresponding number of spikes. These may be observed in real-time as the analogue output 10 of the second spectrum analyzer 9 is displayed on, for example, a radar screen or the like.

Actually, the second spectral processing gives a linear combination of the waveform auto-correlation and two cross-correlation functions centred at both the difference of the natural and artificial delay times and at the sum of them. An evaluation of the autocorrelation function of the sum of the radiated waveform and its delayed copy, $$X_\Sigma(\tau',t)=X(t)+X(t+\tau')$$

gives $$R_\Sigma(\tau,\tau')=2R(\tau)+R(\tau+\tau')+R(\tau-\tau').$$

The basic principles of noise radar using double spectral processing are described above. However, if these basic principles are attempted to be used in a wide-band digital radar processing system, a number of problems are presented.

For example, the full bandwidth of the radiated waveform, preferably a wide-band waveform, needs to be sampled such that it fulfills the Nyquist criteria, and the subsequent processing must be capable of processing the sampled waveform at the same speed, that is, in real-time.

The wide-band waveforms preferably transmitted may comprise very large amounts of information and are extremely heavy to calculate in a real-time digital radar processing system. This requires very fast and costly analog to digital (A/D) converters in order to be able to handle the wide-band radar power spectrum. As an example, in order for analog to digital (A/D) converters to be able to handle a wide-band radar power spectrum of e.g. 10 GHz, it is required that the A/D converters operate on at least 20 GHz in order to fulfill the Nyquist criteria. These types of high sampling A/D converters have a low dynamic range, are expensive and require a very careful design of adjacent circuits. These high sampling A/D converters also forward very large amounts of information, and the problem of processing these very large amounts of information in real-time is still a major challenge. In order for an implementation of a digital wide-band radar processing system to become feasible, these are critical issues that must be solved.

The present invention addresses these critical issues and solves the problem presented above by using a less costly, low sampling A/D converter to undersample the received wideband radar return waveform, and enabling identification and extraction of radar critical information from the undersampled processed information.

Figure 2:
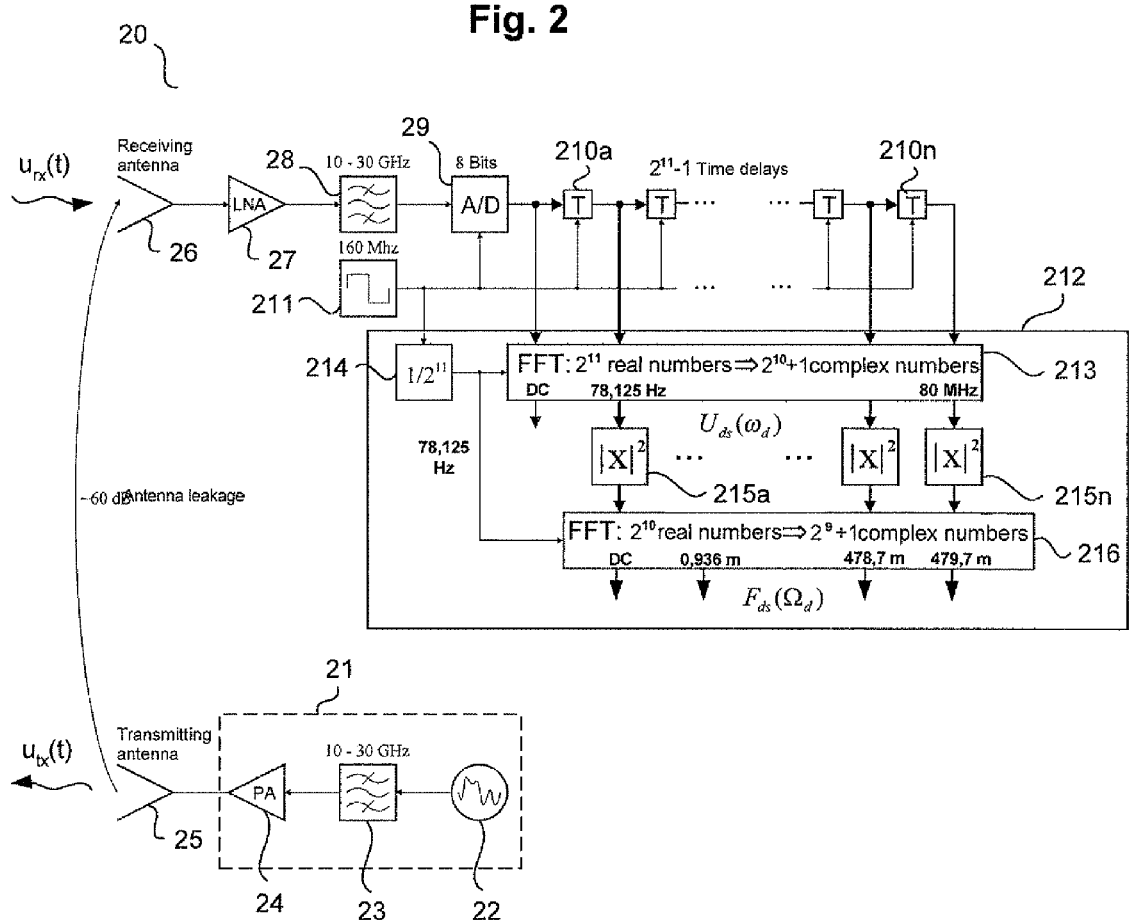
FIG. 2 is a block diagram illustrating an embodiment of a digital radar processing system using spectral processing according to the present invention.

FIG. 2 is a block diagram illustrating an embodiment of a digital wide-band radar processing system 20 using double spectral processing according to the present invention. It should be noted that the exemplary values used in the exemplary embodiments presented below are selected for illustrative purposes only and should not be considered limiting the present invention.

In FIG. 2, a wide-band radar transmitter 21 is arranged to radiate an arbitrary wide-band radar waveform using a transmitting antenna 25. The wide-band radar transmitter 21 may comprise a waveform generator 22, a band-pass filter 23 and a power amplifier 24. The waveform generator 22 may generate a waveform having power at all frequencies in the output bandwidth of wide-band radar transmitter 21, that is, an arbitrary waveform with a flattened frequency spectrum. The arbitrary waveform of the waveform generator 22 may, for example, be noise. The band-pass filter 23 may perform wideband, band-pass filtering of the waveform. The band-pass filter 23 may be chosen so as to pass the wide frequency band suitable for the present invention, for example, 10-20 GHz as in the exemplary embodiment in FIG. 2, but may also be chosen higher or lower. In the present embodiment, a band-pass filter 23 has been chosen so as to pass a frequency band between 10 to 30 GHz. The filtered wide-band waveform may then be amplified by a power amplifier 24 in order to reach an output power for which the radar processing system is designed. The output power of the wide-band radar transmitter 21 is one factor determining the effective range of the radar processing system 20. The power amplifier 24 may then supply the amplified filtered wide-band waveform $u_{rx}(t)$ to the transmitting antenna 25, which may radiate the amplified filtered wide-band waveform $u_{rx}(t)$.

The radiated wide-band waveform $u_{rx}(t)$ will generate a wide-band radar return waveform $u_{rx}(t)$ that will be received by the receiving end of the radar processing system 20. The receiving end of the radar processing system 20 may receive the wide-band radar return waveform $u_{rx}(t)$ by using a receiving antenna 26. A low-noise amplifier 27 may be used to amplify the received wide-band radar return waveform $u_{rx}(t)$ to a level suitable for processing. A band-pass filter 28 may filter the received wide-band radar return waveform $u_{rx}(t)$ so as to only pass the frequency band of interest, that is, the wide frequency band of the radiated wide-band waveform $u_{rx}(t)$. For example, in the present embodiment, the frequency band of interest is between the frequencies between 10 to 30 GHz.

According to the present invention, an undersampling analogue to digital (A/D) converter 29 may be used directly on the received radio frequency (RF) waveform or on a down converted version of the received radio frequency (RF) waveform, i.e. directly on the filtered wide-band radar return waveform or on a down converted version of the same, in order to produce an undersampled digital radar return waveform $u_{ds}[n]$. It should be noted that there is no need to mix or convert down the wide-band radar return waveform $u_{rx}(t)$ into a particular baseband before performing the undersampling. This is normally performed in conventional radar systems.

In the present embodiment, the undersampling A/D-converter 29 is an 8-bit analogue to digital-converter with a sampling frequency of 160 MHz (illustrated in FIG. 2 by block 211). By having an undersampling A/D-converter 29 with a sampling frequency of 160 MHz, the digital radar return waveform $u_{ds}[n]$ will be heavily undersampled. The sampling frequency 211 of 160 MHz surpasses the required sampling frequency of 40 GHz according the Nyquist criteria by a factor of 125. This will cause the wide frequency band of the analogue wide-band radar return waveform $u_{rx}(t)$ to be folded back about 125 times into the baseband of the undersampling A/D-converter 29. This effect or distortion is also known as aliasing. Aliasing is conventionally avoided since it prevents an original waveform from ever being completely reconstructed once it has been sampled, that is, aliasing results in a loss of information.

The undersampled digital radar return waveform $u_{ds}[n]$, and its delayed copies, is then fed into a processing device 212. The processing device 212 may be any apparatus or unit capable of performing real-time processing of data, such as a computer, processor, dedicated hardware or the like. The processing device 213 may be arranged to calculate the frequency spectrum $U_{ds}(\omega_d)$ of the undersampled digital radar return waveform $u_{ds}[n]$ based on a number of consecutive samples. The number of consecutive samples determines the frequency resolution, i.e. the higher amount of samples that are used to calculate the frequency spectrum the higher the resolution in the frequency spectrum is achieved.

The resolution in the frequency spectrum will also determine the maximum distance for which the digital wide-band radar processing system 20 may be able to resolve and detect a target. This is because the distances between peaks in the frequency spectrum for a target will be spaced dependent upon the distance to the target, for example, a distance between peaks in the frequency spectrum for a target located at a distance of 1 m from the radar will be about 149.9 MHz, while a target located at a distance of 10 km from the radar will have a distance between the peaks in the frequency spectrum of about 14.99 kHz. It should be noted that in the example above, it is assumed that the wave propagation velocity for the electromagnetic wave is equal to the speed of light. This is true for free space propagation. However, should the present invention be used in another form of medium, e.g. in a medical application, it is a simple and easy task to adapt the present invention according to the wave propagation speed of the actual medium.

In this embodiment of the present invention, the number of consecutive samples used in calculating the frequency spectrum $U_{ds}(\omega_d)$ is $2^{11}$ samples, which illustrated in FIG. 2 by the time delays 210a-210n. This results in a frequency resolution of 78.125 Hz, as illustrated in FIG. 2. The frequency spectrum may then be calculated by the processing device 212 performing a Fourier Transformation, preferably using the Fast Fourier Transform (FFT), illustrated in FIG. 2 by block 213.

The processing device 212 may further be arranged to calculate the power spectrum of the undersampled digital radar return waveform $|U_{ds}(\omega_d)|^2$ illustrated in FIG. 2 by block 215a-215n.

By performing a second spectral processing calculation, illustrated in FIG. 2 as block 216, of the power spectrum of the undersampled digital radar return waveform $|U_{ds}(\omega_d)|^2$, the processing device 212 may calculate and transform said power spectrum of said undersampled digital signal $|U_{ds}(\omega_d)|^2$ into a ripple frequency domain, that is, into a ripple frequency power spectrum $F_{ds}(\Omega_d)$, by again using Fourier Transformation.

The processing device 212 may be arranged to analyse the ripple frequency power spectrum $F_{ds}(\Omega_d)$ in order to extract radar critical information, such as, for example, detection of a target, the distance to and/or velocity of a target. Spikes in the ripple frequency power spectrum $F_{ds}(\Omega_d)$ may be identified, extracted and used for this purpose. This will be described in more detail in reference to FIGS. 4-8.

Below follows a more in depth mathematical explanation of the principles of the present invention.

In order to achieve a good performance using double spectral processing, assume that the transmitted radar waveform $u_{tx}(t)$ has a wide and flat power spectrum $U_{tx}(\omega)$. This is essential in order to avoid the detection of "false" targets in the spectral processing.

In order to avoid power loss in the subsequent undersampling process, the transmitted radar waveform $u_{tx}(t)$ must also be even and real. This may be accomplished by forming the transmitted radar waveform $u_{tx}(t)$ as the real part of the sum of a arbitrary waveform $u'(t)$ and its mirror waveform around $t=0$, that is, $u_{tx}(t)=\mathrm{Re}(u'(t)+u'(-t))$. The received radar return waveform $u_{rx}(t)$ may then be described by Eq. 1:

$$u_{rx}(t) = D_l \cdot u_{tx}(t) + \sum_{n=0}^{N-1} D_{t_n}(r_n) \cdot u_{tx}\left(t - \frac{2 \cdot r_n}{c_0}\right) + n(t) \quad \text{(Eq. 1)}$$

where $D_l$ represents the antenna leakage between the transmitting antenna and at least one of the receiving antennas, N is the number of targets within range of the radar processing system, $D_t$ is the two-way damping for each target, r is the distance to each target, n(t) represents noise at the receiver end.

$R_{rx}(\tau)$, the autocorrelation function of the transmitted radar waveform $u_{tx}(t)$, may now be calculated according to Eq. 2:

$$R_{rx}(\tau) = D_l^2 \cdot R_{tx}(\tau) + D_l \cdot \sum_{m=0}^{N-1} D_{t_m}(r_m) \cdot R_{tx}\left(\tau + \frac{2 \cdot r_m}{c_0}\right) + \\ D_l \cdot \sum_{n=0}^{N-1} D_{t_n}(r_n) \cdot R_{tx}\left(\tau - \frac{2 \cdot r_n}{c_0}\right) + \\ \sum_{m=0}^{N-1} D_{t_m}(r_m) \cdot \sum_{n=0}^{N-1} D_{t_n}(r_n) \cdot R_{tx}\left(\tau + \frac{2 \cdot r_n}{c_0} - \frac{2 \cdot r_m}{c_0}\right) + R_n(\tau) \quad \text{(Eq. 2)}$$

where $R_n(\tau)$ represents the autocorrelation function of the noise at the radar receiver. $R_n(\tau)$ may however be approximated with a Dirac function, since the receiver is a wide-band radar receiver.

The Fourier transform of the transmitted power spectrum $U_{tx}(\omega)$ is the autocorrelation function $R_{tx}(\tau)$ and the received power spectrum $U_{rx}(\omega)$ may be calculated as the Fourier transform of the $R_{rx}(\tau)$, according to Eq. 3:

$$U_{rx}(\omega) = U_{tx}(\omega) \cdot \left[ D_l^2 + 2 \cdot D_l \cdot \sum_{n=0}^{N-1} D_{t_n}(r_n) \cdot \cos\left(\omega \cdot \frac{2 \cdot r_n}{c_0}\right) + \underbrace{\sum_{n=0}^{N-1} \sum_{m=0}^{N-1} D_{t_n}(r_n) \cdot D_{t_m}(r_m) \cdot e^{j\omega\left(\frac{2 \cdot r_n}{c_0} - \frac{2 \cdot r_m}{c_0}\right)}}_{\text{very small} \approx 0} \right] + N(\omega) \quad \text{(Eq. 3)}$$

Eq. 3 correspond to the first spectral processing, that is, the calculation of the Fourier transform of the received wide-band radar return waveform $u_{rx}(t)$ performed in block 213 in the processing device 212 in FIG. 2. Each target in the received power spectrum $U_{rx}(\omega)$ is represented by a frequency ripple with the time variable $$\frac{2 \cdot r_n}{c_0},$$

and with an amplitude proportional to $D_t$.

In the received power spectrum $U_{rx}(\omega)$ there are a few parameters that are of particular interest according to the present invention, for example, the time variable $$\frac{2 \cdot r_n}{c_0}$$

which is proportional to the distance to each target, respectively; the absolute value of the two-way damping $|D_t|$ which is a function of the distance to, and the radar target area of the actual target; and the phase shifting rate in $D_t$ which is a function of the speed of the actual target. According to the present invention, the processing device 212 makes use of the fact that these parameters are relatively unaffected by sampling rates, if selected appropriately, that does not fulfill the Nyquist criteria, as will become apparent in reference to FIG. 3 and the simulation results presented in reference to FIG. 4.

The resulting power spectrum of the wide-band radar return waveform $u_{rx}(t)$ may, after the undersampling, be represented by Eq. 4:

$$U_s(\omega) = \frac{1}{T_s} \cdot \left[ \sum_{q=Q_c-Q_b}^{-Q_c+Q_b} U_{rx}\left(\omega - q \cdot \frac{2 \cdot \pi}{T_s}\right) + \sum_{q=Q_c-Q_b}^{Q_c+Q_b} U_{rx}\left(\omega - q \cdot \frac{2 \cdot \pi}{T_s}\right) \right] \quad \text{(Eq. 4)}$$

where $Q_c=\mathrm{round}(f_c \cdot T_S)$ and $Q_b=\mathrm{round}(B \cdot T_S/2)$, wherein $f_c$ represents a centre frequency and B represents the bandwidth. $T_S$ represents the time between two consecutive samples.

By inserting Eq. 3 in Eq. 4, Eq. 5 may be obtained:

$$U_s(\omega) \approx \frac{2 \cdot D_l \cdot \overline{U_{tx}}}{T_s} \cdot \sum_{n=0}^{N-1} \left\{ \begin{array}{l} \sum_{q=-Q_c-Q_b}^{-Q_c+Q_b} D_{t_n}(r_n) \cdot \\ \cos\left[\frac{2 \cdot r_n}{c_0} \cdot \left(\omega - q \cdot \frac{2 \cdot \pi}{T_s}\right)\right] + \\ \sum_{q=Q_c-Q_b}^{Q_c+Q_b} D_{t_n}(r_n) \cdot \\ \cos\left[\frac{2 \cdot r_n}{c_0} \cdot \left(\omega - q \cdot \frac{2 \cdot \pi}{T_s}\right)\right] \end{array} \right\} \quad \text{(Eq. 5)}$$

where the "DC-term" and the frequency dependency in $U_{tx}(\omega)$ are assumed to be negligible.

By calculating Eq. 5 for the discrete frequencies $\omega_d$, in accordance with Eq. 6:

$$U_s\left(\omega_d \cdot \frac{2 \cdot \pi}{4 \cdot (N_\Omega - 1) \cdot T_s}\right) \approx \quad \text{(Eq. 6)}$$

$$\frac{2 \cdot D_l \cdot \overline{U_{tx}}}{T_s} \cdot \sum_{n=0}^{N-1} \left\{ \begin{array}{l} \sum_{q=-Q_c-Q_b}^{-Q_c+Q_b} D_{t_n}(r_n) \cdot \\ \cos\left[\frac{2 \cdot \pi}{T_s} \cdot \frac{2 \cdot r_n}{c_0} \cdot \left(\frac{\omega_d}{4 \cdot (N_\Omega - 1)} - q\right)\right] + \\ \sum_{q=Q_c-Q_b}^{Q_c+Q_b} D_{t_n}(r_n) \cdot \\ \cos\left[\frac{2 \cdot \pi}{T_s} \cdot \frac{2 \cdot r_n}{c_0} \cdot \left(\frac{\omega_d}{4 \cdot (N_\Omega - 1)} - q\right)\right] \end{array} \right\}$$

the discrete undersampled frequency spectrum $U_{ds}(\omega_d)$ may be approximated and be represented according to Eq. 7:

$$U_{ds}(\omega_d) \approx \frac{2 \cdot D_l \cdot \overline{U_{tx}}}{T_s} \cdot \sum_{n=0}^{N-1} \left\{ \begin{array}{l} \sum_{q=-Q_c-Q_b}^{-Q_c+Q_b} D_{t_n}(r_n) \cdot \\ \cos\left[\begin{array}{l} \frac{2 \cdot \pi}{T_s} \cdot \frac{2 \cdot r_n}{c_0} \cdot \\ \left(\frac{\omega_d}{4 \cdot (N_\Omega - 1)} - q\right) \end{array}\right] + \\ \sum_{q=Q_c-Q_b}^{Q_c+Q_b} D_{t_n}(r_n) \cdot \\ \cos\left[\begin{array}{l} \frac{2 \cdot \pi}{T_s} \cdot \frac{2 \cdot r_n}{c_0} \cdot \\ \left(\frac{\omega_d}{4 \cdot (N_\Omega - 1)} - q\right) \end{array}\right] \end{array} \right\} \quad \text{(Eq. 7)}$$

The processing device 212 in FIG. 2 may be arranged to continuously calculate, in real-time, the discrete frequency spectrum $U_{ds}(\omega_d)$ of the undersampled digital radar return waveform $u_{ds}[n]$ according to Eq. 7 in block 213. The processing device 212 in FIG. 2 may also be arranged to calculate the power spectrum of the undersampled digital radar return waveform $|U_{ds}(\omega_d)|^2$ as indicated by the blocks 215a-215n in FIG. 2.

By performing a second spectral processing, also known in the prior art as double spectral processing, of the power spectrum $U_s(\omega)$ with respect to $\omega$, the power spectrum $U_s(\omega)$ may be said to be transformed into a ripple frequency domain, that is, result in the function $F_s(\Omega)$. Ripple frequencies or distance channels may be used herein to denote the abstract value of $\Omega$. In the ripple frequency domain, each target may be identified as a local maximum or spike at a "particular ripple frequency" or specific distance channel, $\Omega$. The local maximum or spike of each target is proportional to the time variable $$\frac{2 \cdot r_n}{c_0}.$$

The cause of the presence of these "ripple frequencies" is the mixture of the transmitted and received waveform. The present invention may use the antenna leakage between the transmitter and the receiver as a coupling for achieving this mixture, as shown, for example, in the exemplary embodiment of FIG. 2. However, it is also possible to couple the transmitter and receiver such that some of the transmitted waveform may be mixed with the received waveform, for example, as shown in FIG. 1.

The resulting function $F_s(\Omega)$ may be approximated according to Eq. 8:

$$F_s(\Omega) \approx \frac{4 \cdot D_l \cdot \overline{U_{tx}}}{T_s} \cdot \sum_{n=0}^{N-1} D_{t_n}(r_n) \cdot \psi\left(\frac{2 \cdot r_n}{c_0}, \Omega\right) \cdot \sum_{q=Q_c-Q_b}^{Q_c+Q_b} \cos\left(q \cdot \frac{2 \cdot \pi}{T_s} \cdot \frac{2 \cdot r_n}{c_0}\right) \quad \text{(Eq. 8)}$$

where $\psi(a,b)$ is defined by Eq. 9:

$$\psi(a, b) = \int_{-\infty}^{\infty} \cos(a \cdot x) \cdot \cos(b \cdot x) \cdot dx \quad \text{(Eq. 9)}$$

$$= \pi \cdot [\delta(a - b) + \delta(a + b)]$$

Accordingly, the processing device 212 in FIG. 2 may further be arranged to continuously calculate, in real-time, the discrete ripple frequency power spectrum $F_{ds}(\Omega_d)$ according to Eq. 10 (shown in block 216 in FIG. 2):

$$F_{ds}(\Omega_d) = \frac{1}{N_\Omega} \cdot \sum_{k=0}^{N_\Omega-1} U_{ds}\left(\frac{2 \cdot \pi}{T_s} \cdot \frac{k}{2 \cdot (N_\Omega - 1)}\right) \cdot e^{-j \cdot 2 \cdot \pi \cdot k \cdot \Omega_d / N_\Omega} \quad \text{(Eq. 10)}$$

By entering the discrete undersampled frequency spectrum $U_{ds}(\omega_d)$ according to Eq. 7 into Eq. 10, and simplifying the resulting equation, Eq. 11 may be obtained:

$$F_{ds}(\Omega_d) \approx \frac{2 \cdot D_l \cdot \overline{U_{tx}}}{T_s \cdot N_\Omega} \cdot \quad \text{(Eq. 11)}$$

-continued $$\sum_{n=0}^{N-1}\left\{\begin{array}{l}\sum_{q=-Q_c-Q_b}^{-Q_c+Q_b}D_{t_n}(r_n)\cdot\sum_{k=0}^{N_\Omega-1}\cos\left[\frac{2\cdot\pi}{T_s}\cdot\frac{2\cdot r_n}{c_0}\cdot\right.\\\left.\left(\frac{k}{2\cdot(N_\Omega-1)}-q\right)\right]\cdot\\ e^{-j\cdot 2\cdot\pi\cdot k\cdot\Omega_d/N_\Omega}+\sum_{q=Q_c-Q_b}^{Q_c+Q_b}D_{t_n}(r_n)\cdot\\\sum_{k=0}^{N_\Omega-1}\cos\left[\frac{2\cdot\pi}{T_s}\cdot\frac{2\cdot r_n}{c_0}\cdot\right.\\\left.\left(\frac{k}{2\cdot(N_\Omega-1)}-q\right)\right]\cdot e^{-j\cdot 2\cdot\pi\cdot k\cdot\Omega_d/N_\Omega}\end{array}\right\}$$

The processing device 212 in FIG. 2 may be arranged to, from the result of Eq. 11, locate "particular ripple frequencies" in the discrete ripple frequency power spectrum $F_{ds}(\Omega_d)$ that may indicate targets. By identifying those "particular ripple frequencies", the processing device 212 in FIG. 2 is capable of detecting radar targets and their distances from the digital wide-band radar processing system 20 in FIG. 2. The process of extracting the radar target information is illustrated in more detail in the exemplary simulation results presented in reference to FIG. 4.

Figure 3:
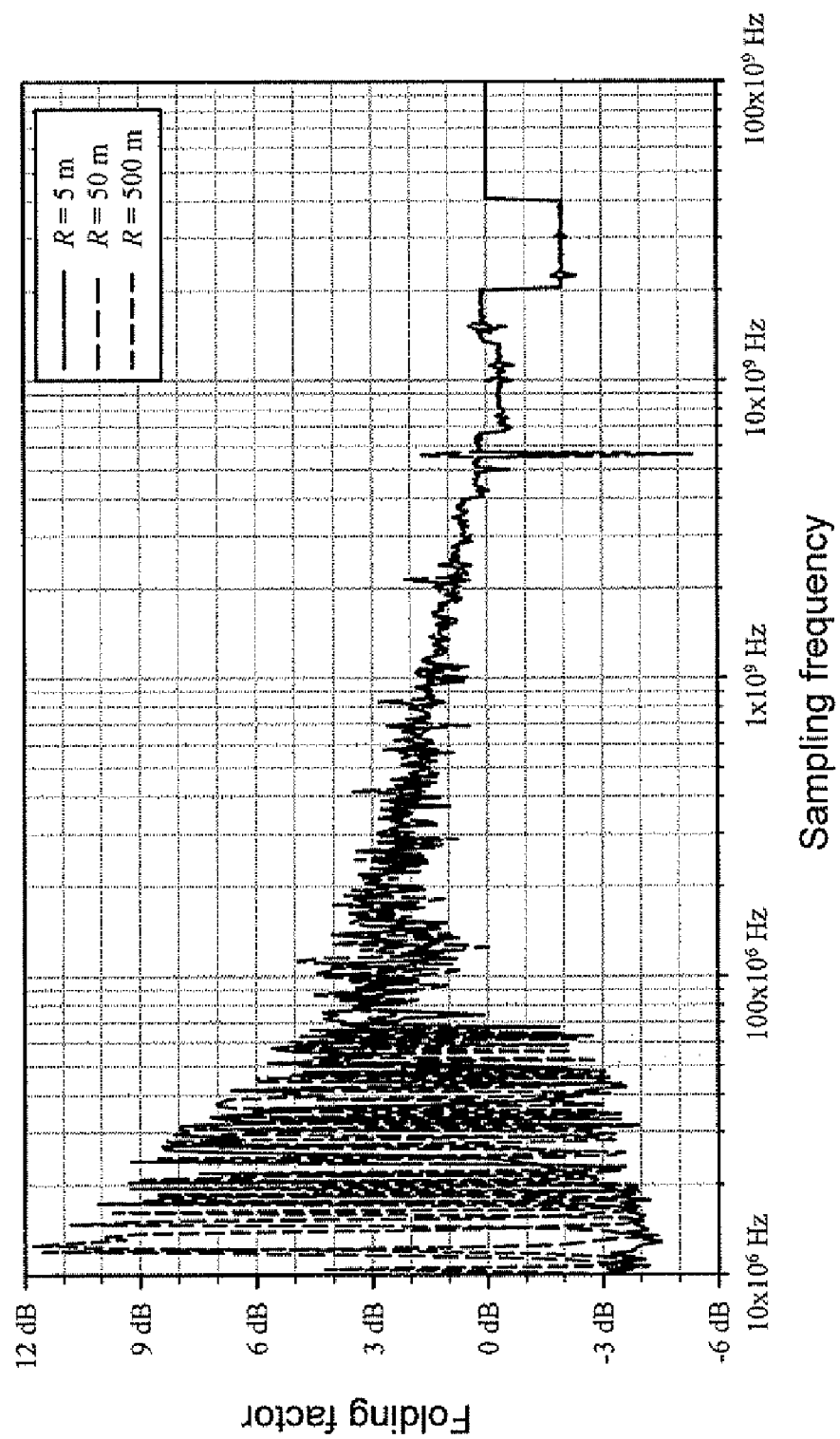
FIG. 3 is a schematic diagram showing a folding factor as a function of a sampling frequency.

FIG. 3 is a schematic diagram showing a folding factor for three distances as a function of the sampling frequency of the undersampling A/D converter 29 in the digital wide-band radar processing system 20 in FIG. 2.

Assuming, for illustrative purposes, that all targets are momentarily stationary, that is, $v_n \equiv 0$, the schematic diagram shown in FIG. 3 illustrates the result of the folding factor according to Eq. 12:

$$\sum_{q=Q_c-Q_b}^{Q_c+Q_b}\cos\left[2\cdot q\cdot\frac{2\cdot\pi}{T_s\cdot c_0}\cdot\left(r_{0_n}+v_n\cdot\frac{l\cdot T_{int}}{N_v-1}\right)\right]\quad\text{(Eq. 12)}$$

for the three distances of $r_{0_n}$, i.e. R=5 m, 50 m and 500 m, when using the exemplary digital wide-band radar processing system 20 in FIG. 2. Note that for the purpose of illustration, all of the values of the folding factor in FIG. 2 have been calculated as a mean value of points with a separation of 1 cm for the discrete ripple frequency or distance channel, $\Omega_d$=0.936 m.

The folding factor is a measurement of the amount of aliasing (folding) loss occurring in the digital wide-band radar return waveform as a result of the undersampling performed by the undersampling A/D converter 29 in FIG. 2. As can be seen in FIG. 2, the folding factor as defined by Eq. 16 is stabilized and becomes less dependent on the distance as the sampling frequency is above approximately 80 MHz. It can also been seen that the folding factor become 0 dB as the sampling frequency becomes 40 GHz, that is, when no undersampling occurs and the Nyquist criteria is fulfilled.

Therefore, according to the present invention, by selecting a sampling frequency of the undersampling A/D converter 29 in FIG. 2 below the sampling rate required by the wide-band radar returns in order to fulfill the Nyquist criteria (for example, 40 GHz in FIG. 3), and such that the folding factor in Eq. 12 is stabilized, and located or varying within particular acceptable limit values (such as, for example, above 80 MHz in FIG. 3), the digital wide-band radar processing system 20 may utilize less expensive components and components that are more suitable for implementation in an actual application. This is because the ripple frequencies then remain basically unaffected by the aliasing caused by the undersampling, and therefore are identifiable in the discrete ripple frequency power spectrum of the undersampled digital radar waveform. Accordingly, this may be performed without substantially reducing the performance of the digital wide-band radar processing system 20, and still provide a satisfying result. Note that there is no sharp performance step as a function of the sampling frequency due to the specific selection of a particular sampling frequency of the undersampling A/D converter 29, as in comparison to conventional digital radar systems wherein the result of not fulfilling the Nyquist criteria will be a drastic reduction in performance of the radar system.

Figure 4:
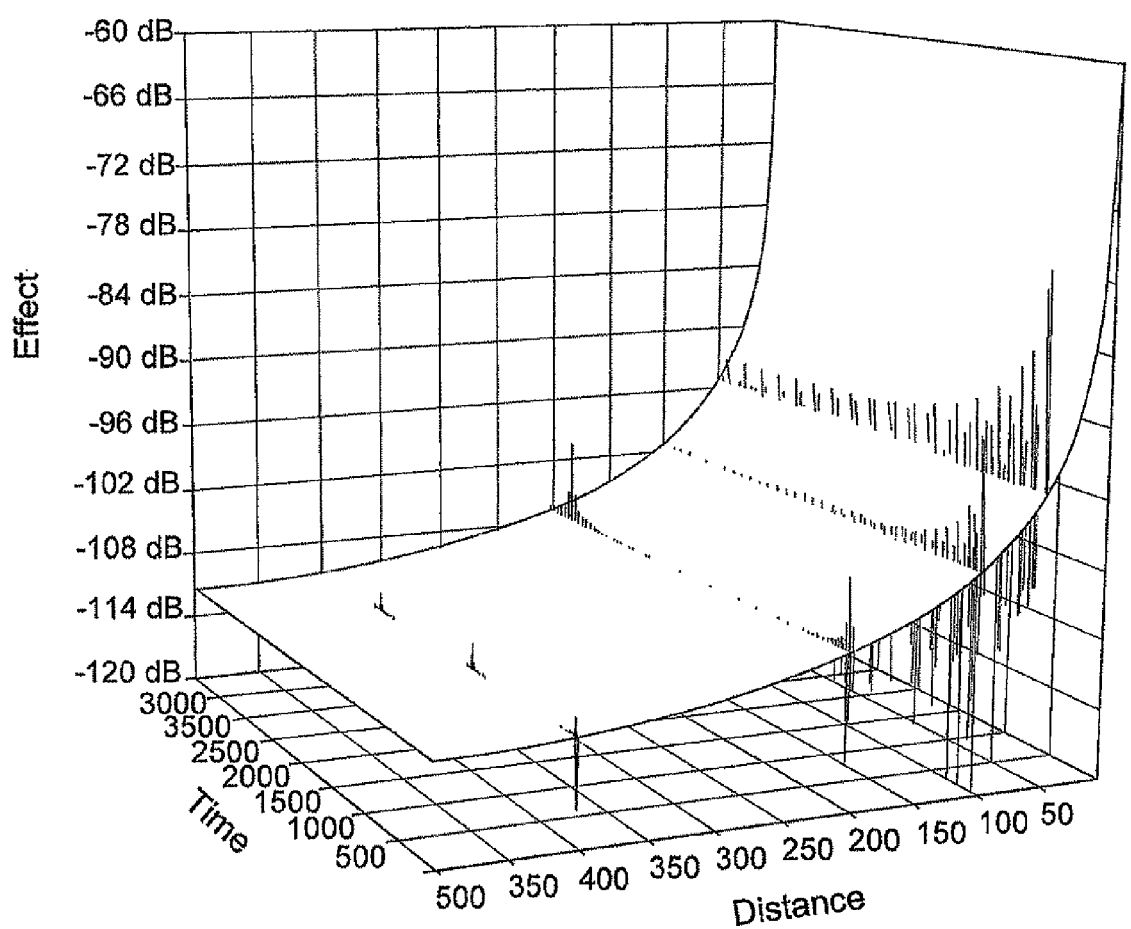
FIG. 4 is an image graphics illustrating an output of the spectral processing in an exemplary simulation according to an embodiment of the present invention.

FIG. 4 shows a first image graphics illustrating the resulting output of the spectral processing performed by the processing device 212 in the digital wide-band radar processing system 20 in FIG. 2 during an exemplary simulation.

The exemplary simulation comprises four individual targets. The radial speed and target area of each individual targets are assumed to be fixed during the exemplary simulation. For illustrative purposes, the length of the exemplary simulation is reduced to 1/16 of the total integration time, that is, the exemplary simulation is approximately 50 ms in duration. The initial starting data for each of the individual targets are presented in table 1:

TABLE 1

Initial starting data.

| Target | Initial distance | Speed | Target area |
|---|---|---|---|
| 1 | 46,843 m | 5.0 m/s | 1.0 m² |
| 2 | 93,685 m | −10.0 m/s | 1.0 m² |
| 3 | 187,370 m | 20.0 m/s | 1.0 m² |
| 4 | 374,741 m | −50.0 m/s | 1.0 m² |

In this exemplary simulation, a wide-band noise waveform $u_{tx}(t)$ is radiated and the wide-band radar return waveform $u_{rx}(t)$ is received by the receiving antenna 26. The digital wide-band radar processing system 20 performs the undersampling and spectral processing described in the exemplary embodiment described above.

In FIG. 4, the resulting output, $F_{ds}(\Omega_d, t_d)$, that is, the ripple frequency power spectrum, of the spectral processing performed by the processing device 212 are presented in a graphical representation. The values of the discrete time steps and discrete distance steps that are used in the exemplary simulation are presented in table 2:

TABLE 2

Discrete values.

| Variable | Unit | Value (analytical) | Value (numerical) |
|---|---|---|---|
| Time | $t_d$ | $4 \cdot T_s \cdot (N_\Omega - 1)$ | 12.8 μs |
| Frequency | $\omega_d$ | $2 \cdot \pi/t_d$ | $2 \cdot \pi \cdot 78.125 \cdot 10^3$ rad/s |
| Distance | $\Omega_d$ | $c_0 \cdot T_s/2$ | 0.936 m |

TABLE 2-continued

Discrete values.

| Variable | Unit | Value (analytical) | Value (numerical) |
|---|---|---|---|
| Speed | $v_d$ | $\dfrac{c_0}{8 \cdot (N_\Omega - 1) \cdot (Q_c \pm Q_b) \cdot 2^{\left(\text{round}\left(\frac{\ln(T_{int}/t_d)}{\ln(2)}\right)\right)}}$ | 0.09555629 m/s . . . . . . 0.2836353 m/s |

As can be seen in FIG. 2, the four individual targets are readily discernable at their initial starting distance at the start of the exemplary simulation. However, the folding factor (Eq. 16), illustrated in FIG. 3, will at later points in time affect the amplitude at the discrete ripple frequencies that represent the targets.

The basic level or floor shown in FIG. 4 depends on the selected power spectrum of the radiated waveform. In this exemplary simulation, the power spectrum of the radiated waveform is presented in Eq. 13:

$$U_{tx}(\omega) = \sqrt{\frac{\pi}{2}} \cdot \frac{\sigma^2}{\omega_B} \cdot \left[ e^{-\frac{1}{2}\left(\frac{\omega - \omega_c}{\omega_B}\right)^2} + e^{-\frac{1}{2}\left(\frac{\omega + \omega_c}{\omega_B}\right)^2} \right] \quad \text{(Eq. 13)}$$

where σ represents the expected value of the amplitude of the radiated waveform. A wider bandwidth of the power spectrum of the radiated waveform will generate a sharper slope towards zero distance from the transmitting antenna. A wider band-width of the power spectrum of the radiated waveform will also generate a smaller correlation peak and lead to an improved ability in detecting targets at shorter distances. Also, since the autocorrelation of the radiated waveform is known, it is also easy to normalize the basic level or floor to an even level. Advantageous is that the basic level or floor decreases with a growing distance to a target, as can be seen in FIG. 4, since the amplitude of the radar returns of a target conventionally also decreases in dependence of a growing distance from the transmitting antenna.

The processing device 212 in FIG. 2 may thereby be arranged to locate the "particular ripple frequencies" indicating individual targets in the power spectrum of said under-sampled digital radar return waveform $|U_{ds}(\Omega_d)|^2$ by performing the spectral processing described in the reference to FIGS. 2-3. From the location of said "particular ripple frequencies" in the power spectrum, the processing device 212 in FIG. 2 may be arranged to extract radar target information, such as, for example, the detection of radar targets and distances to said radar targets.

Also, note that the folding factor is repeated in time in proportion to the speed of each individual target, respectively. This may be used according to another embodiment of the present invention as will be described in reference to FIG. 5 to obtain further radar target information, such as, for example, the radial speed of a target.

Figure 5:
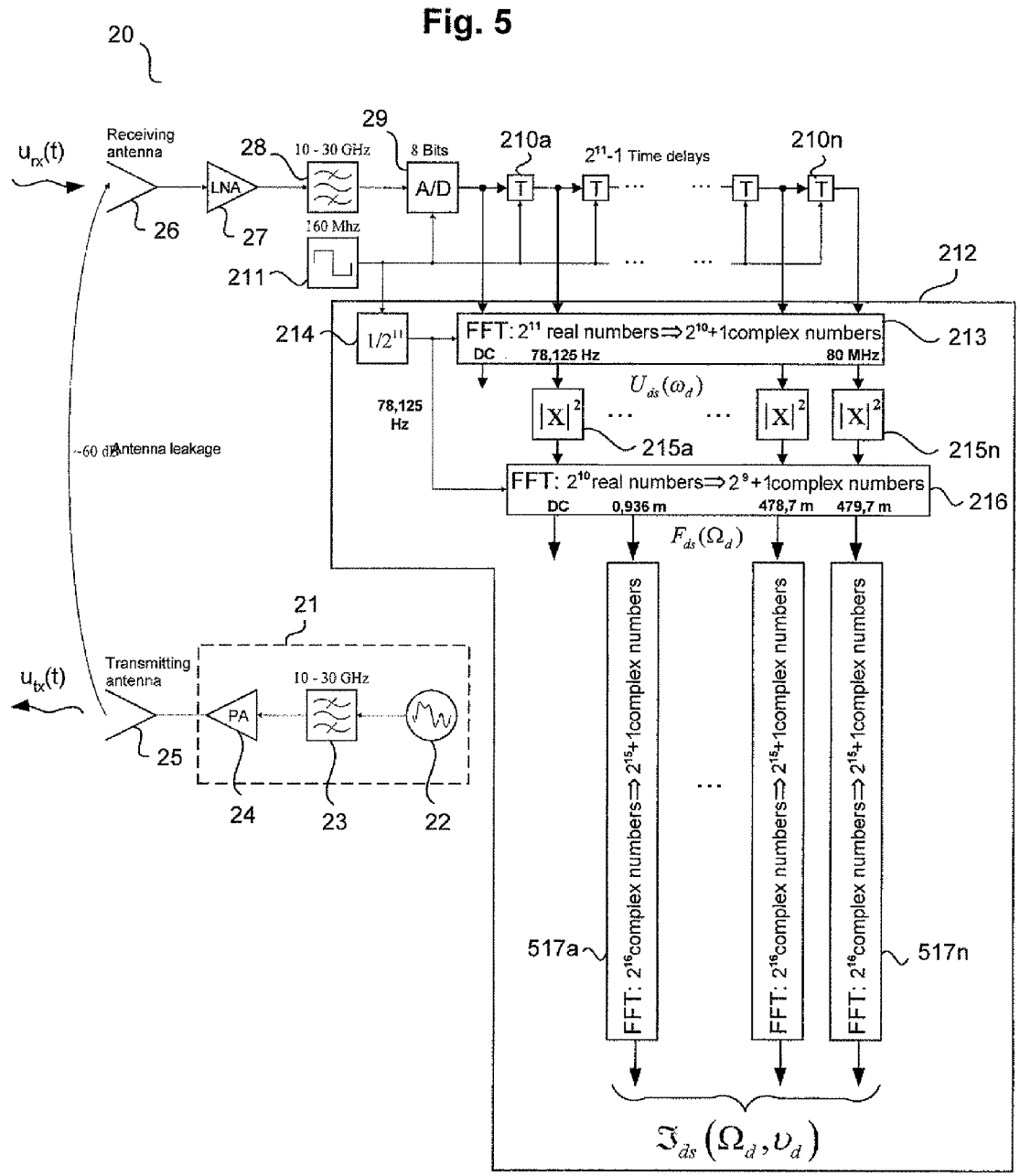
FIG. 5 is a block diagram illustrating another embodiment of a digital radar processing system using spectral processing according to the present invention.

FIG. 5 is a block diagram illustrating another embodiment of a digital wide-band radar processing system 50 using double spectral processing according to the present invention.

The digital radar processing system 50 in FIG. 5 is identical to the digital wide-band radar processing system 20 in FIG. 3, except that the processing device 512 of the digital radar processing system 50 also comprises means for calculating the speed $v_d$ of the targets, as indicated by the "particular ripple frequencies" found in the discrete ripple frequency power spectrum $F_{ds}(\Omega_d)$ according to Eq. 14 (shown in block 216 in FIG. 5). This is performed by calculating (as indicated by blocks 517a-517n in FIG. 5) a third Fourier transform for each of the "particular ripple frequencies", or specific distance channels, $\Omega_d$ of the discrete ripple frequency power spectrum $F_{ds}(\Omega_d)$.

For the purpose of illustration, each target is allocated a speed $v_n$ in said calculation. The distance $r_n$ for each target n is then dependent on the time t according to Eq. 14:

$$r_n(t) = r_{0n} + v_n \cdot t \quad \text{(Eq. 14)}$$

The discrete ripple frequency power spectrum $F_{ds}(\Omega_d)$ according to Eq. 11 then transitions into $F_{ds}(\Omega_d, t)$. The result of the third Fourier transform is presented in Eq. 15:

$$\mathfrak{I}_{ds}(\Omega_d, v_d) = \frac{1}{N_v} \cdot \sum_{l=0}^{N_v - 1} F_{ds}\left(\Omega_d, \frac{l \cdot T_{int}}{N_v - 1}\right) \cdot e^{-j \cdot 2 \pi \cdot l \cdot v_d / N_v}. \quad \text{(Eq. 15)}$$

By entering $F_{ds}(\Omega_d)$ of Eq. 11 and the time dependent target distance according to Eq. 14 in to Eq. 15, and simplifying the resulting equation, Eq. 16 may be obtained:

$$\mathfrak{I}_{ds}(\Omega_d, v_d) \approx \quad \text{(Eq. 16)}$$

$$\frac{4 \cdot D_l \cdot \overline{U_{tx}}}{T_s \cdot N_\Omega \cdot N_v} \cdot \sum_{n=0}^{N-1} \sum_{k=0}^{N_\Omega - 1} \sum_{l=0}^{N_v - 1} D_{t_n}\left(r_{0_n} + v_n \cdot \frac{l \cdot T_{int}}{N_v - 1}\right) \cdot$$

$$\cos\left[\frac{k}{N_\Omega - 1} \cdot \frac{2 \cdot \pi}{T_s \cdot c_0} \cdot \left(r_{0_n} + v_n \cdot \frac{l \cdot T_{int}}{N_v - 1}\right)\right] \cdot e^{-j \cdot 2 \pi \cdot \left(\frac{k \cdot \Omega_d}{N_\Omega} + \frac{l \cdot v_d}{N_v}\right)} \cdot$$

$$\sum_{q = Q_c - Q_b}^{Q_c + Q_b} \cos\left[2 \cdot q \cdot \frac{2 \cdot \pi}{T_s \cdot c_0} \cdot \left(r_{0_n} + v_n \cdot \frac{l \cdot T_{int}}{N_v - 1}\right)\right].$$

Note the presence of the folding factor according to Eq. 16, which was discussed above in reference to FIG. 3. The result of the third Fourier transform according to Eq. 16 is presented below by the image graphics of FIGS. 6-9.

Figure 6:
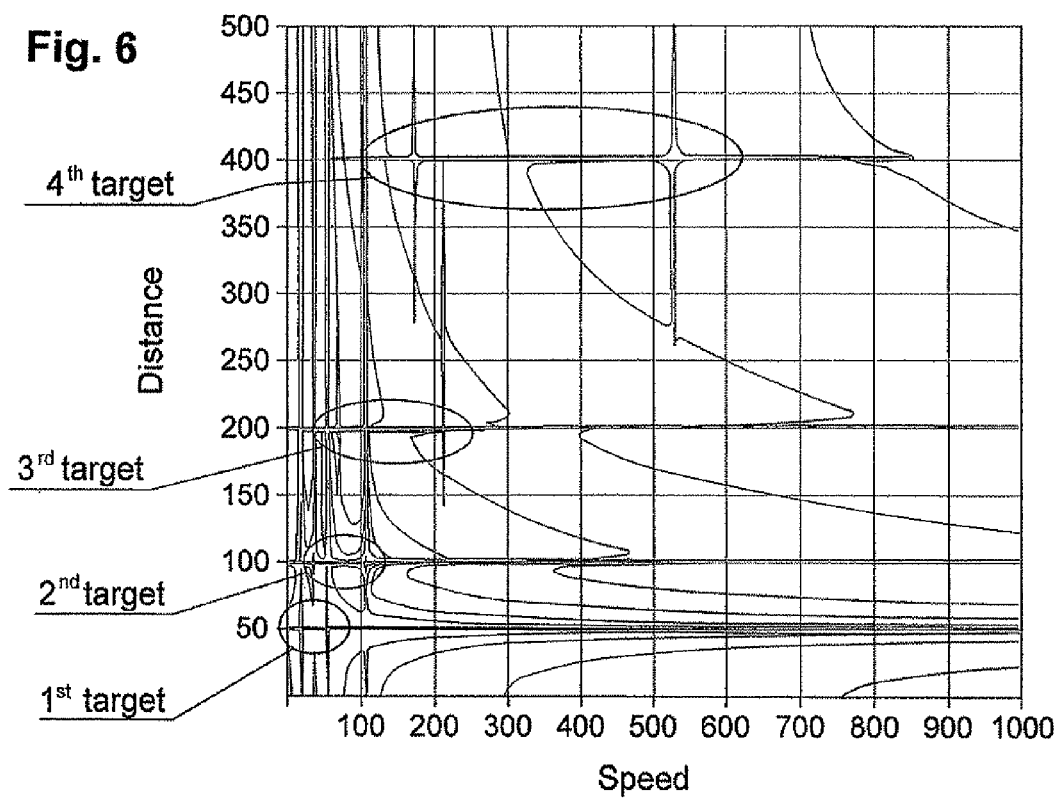
FIG. 6 is another image graphics illustrating an output of the spectral processing in an exemplary simulation according to an embodiment of the present invention.

FIG. 6 shows an image graphics illustrating the resulting output of the spectral processing performed by the processing device 512 in the digital radar processing system 50 in FIG. 5 during an exemplary simulation.

The image graphics of FIG. 6 illustrates the absolute value of the result of the third Fourier transform performed by the processing device 512 in FIG. 5 (as shown by the blocks 517a-517n), that is, $|\mathfrak{I}_{ds}(\Omega_d, v_d)|$. The values of the discrete distance steps and the discrete speed steps are presented in table 2 above. The image graphics shows elevation ridges of an orthographic projection of $|\mathfrak{I}_{ds}(\Omega_d, v_d)|$. From the image graphics in FIG. 6, each of the four targets of the exemplary simulation can be clearly discerned, as indicated. As can be seen, the targets will appear elongated in the speed dimension. This is because of the undersampling performed by the present invention. The elongation is dependent upon the fact that a discrete speed step is not precise or unequivocal, but lies within an interval. The intervals of the targets are results of the folding (aliasing) of spectral components caused by said undersampling.

However, since the size of the intervals are known (as can be seen in table 2), the processing device 512 in the digital wide-band radar processing system 50 in FIG. 5, may be arranged to filter out the elevation ridges in the speed dimension (circled in FIG. 6 and indicating each of the targets), having the correct elongation. The processing device 512 may calculate the quota between $v_{d_{max}}$ and $v_{d_{min}}$, which has to fulfill Eq. 21 in order to be determined as a correct elongation:

$$\frac{v_{d_{max}}}{v_{d_{min}}} = \frac{Q_c + Q_b}{Q_c - Q_b} \quad \text{(Eq. 21)}$$

The processing device 512 in FIG. 5 may be arranged to determine the speed of each of the targets based upon the detected elevation ridges in the speed dimension of the output of the third Fourier transform according to Eq. 20 corresponding to each of the targets, respectively.

Figure 7:
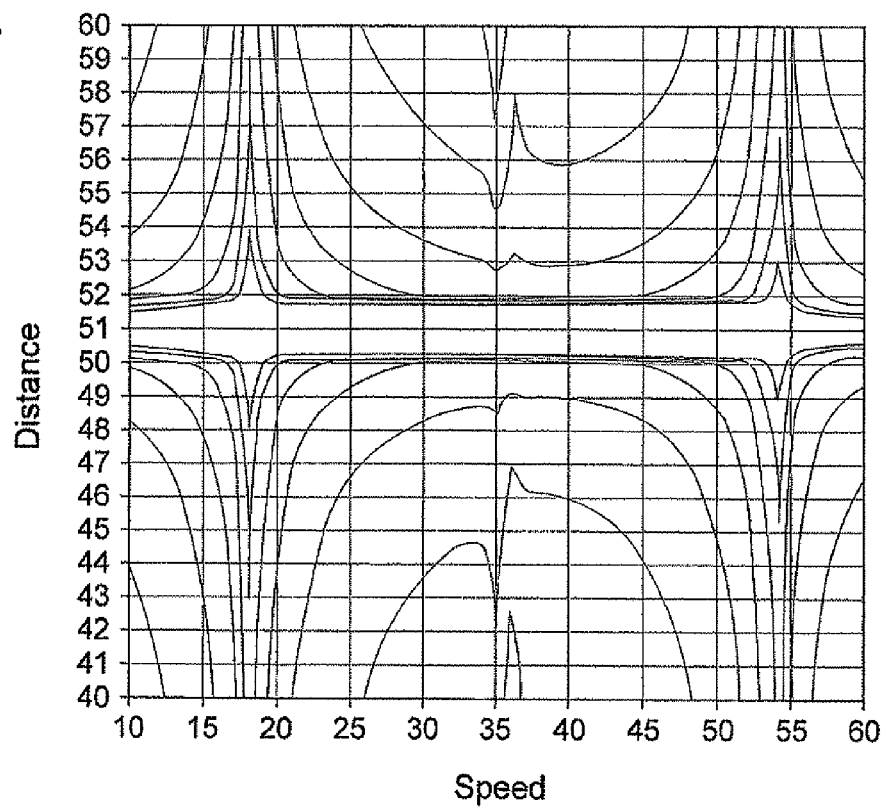
FIG. 7 is a further image graphics illustrating an enhanced section of the image graphics shown in FIG. 6 indicating a first target.

FIG. 7 is an image graphics illustrating an enhanced section of the image graphics shown in FIG. 6 indicating a 1$^{st}$ target. In FIG. 7, the enhanced section includes an elevation ridge with a proper elongation that is detected by the processing device 512 in FIG. 5 and which indicates the 1$^{st}$ target.

Figure 8:
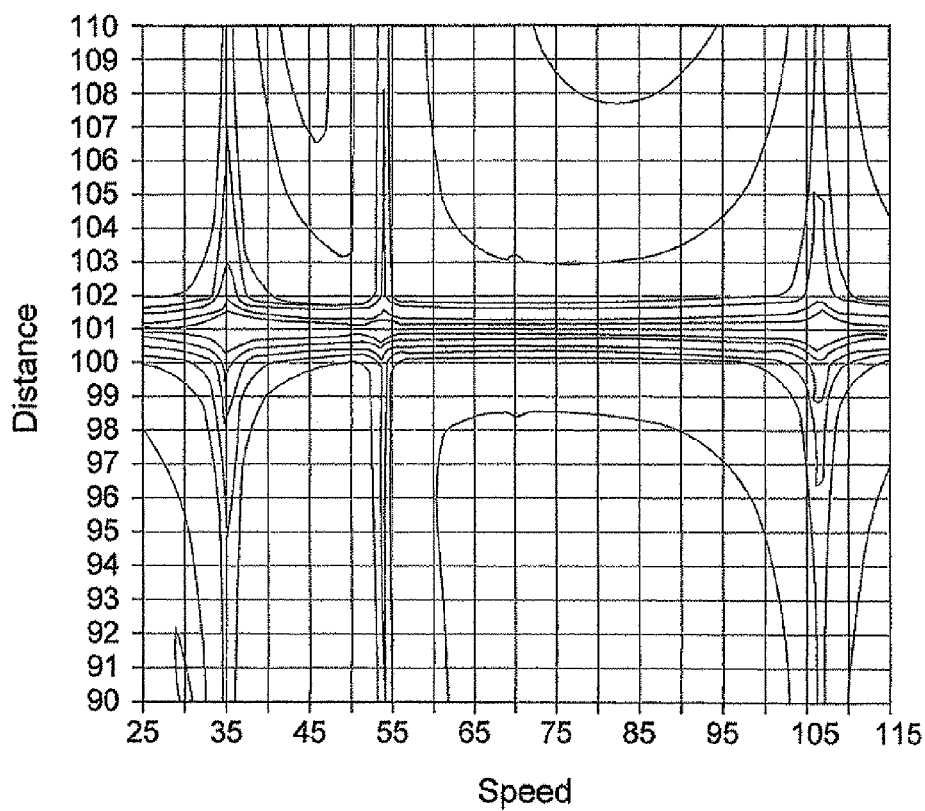
FIG. 8 is a further image graphics illustrating an enhanced section of the image graphics shown in FIG. 6 indicating a second target.

FIG. 8 is an image graphics illustrating an enhanced section of the image graphics shown in FIG. 6 indicating a 2$^{nd}$ target. In FIG. 8, the enhanced section includes an elevation ridge with a proper elongation that is detected by the processing device 512 in FIG. 5 and which indicates the 2$^{nd}$ target.

Figure 9:
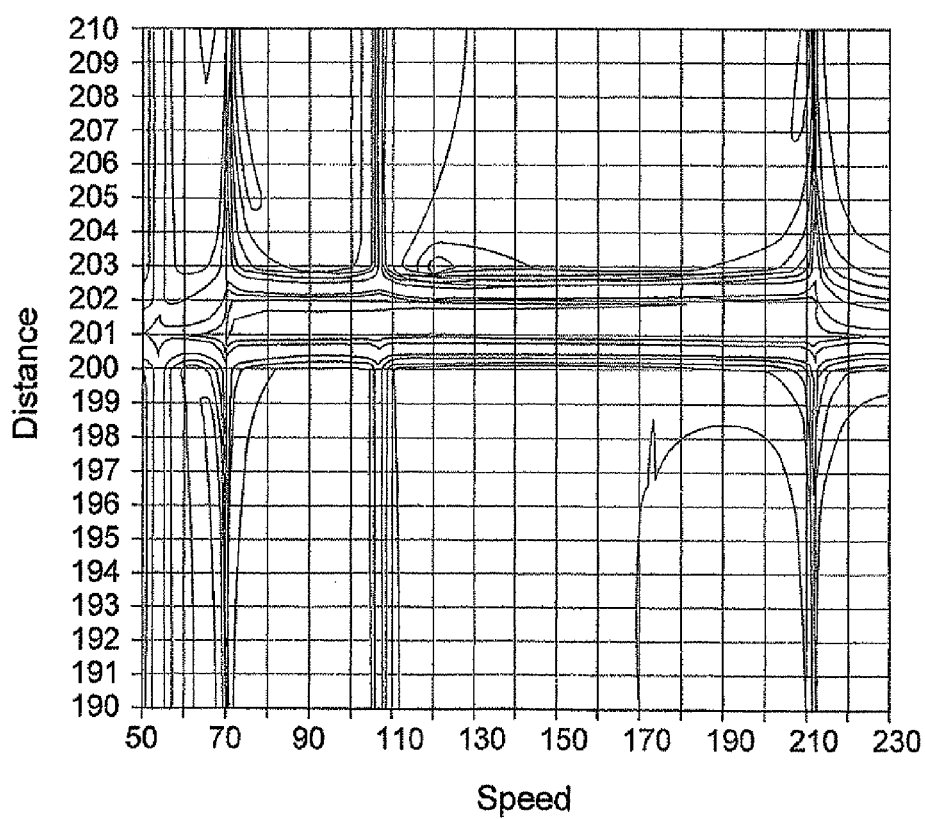
FIG. 9 is a further image graphics illustrating an enhanced section of the image graphics shown in FIG. 6 indicating a third target.

FIG. 9 is an image graphics illustrating an enhanced section of the image graphics shown in FIG. 6 indicating a 3$^{rd}$ target. In FIG. 9, the enhanced section includes an elevation ridge with a proper elongation that is detected by the processing device 512 in FIG. 5 and which indicates the 3$^{rd}$ target.

Figure 10:
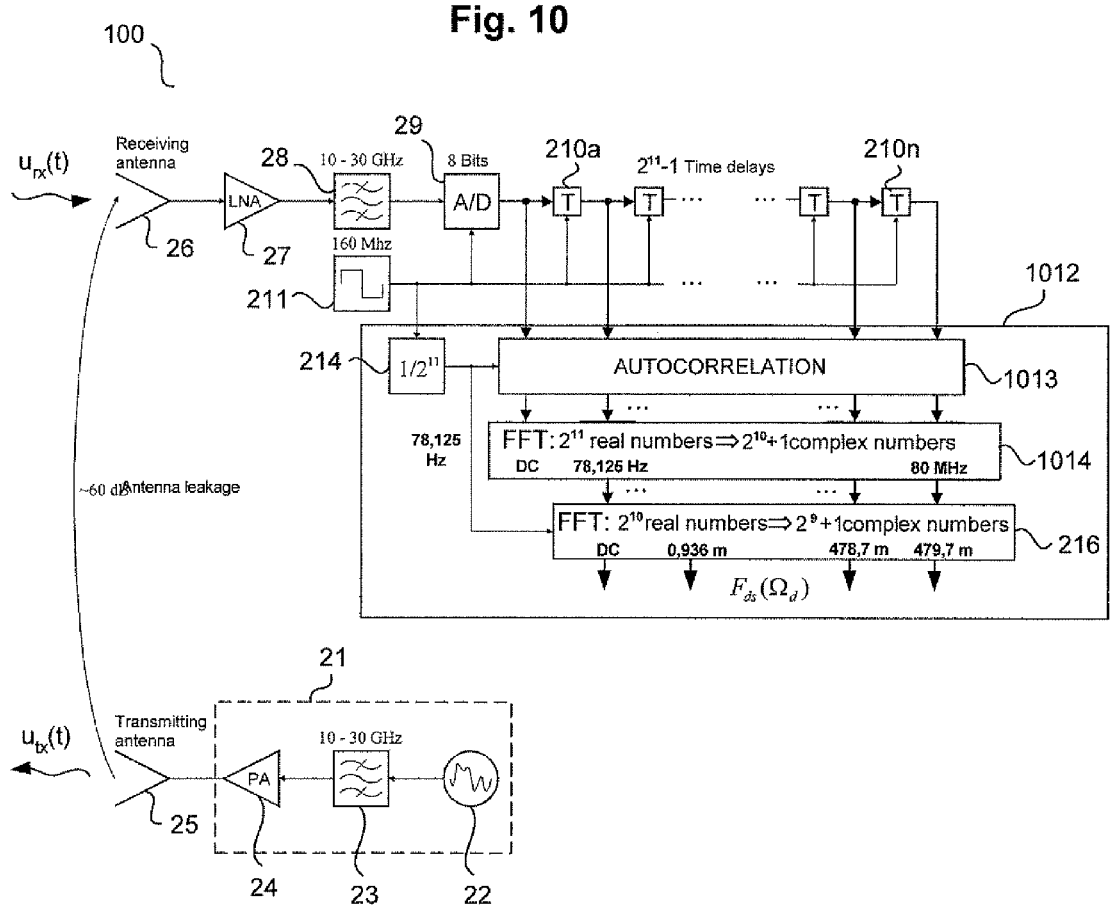
FIG. 10 is a block diagram illustrating another embodiment of a digital radar processing system using spectral processing according to the present invention.

FIG. 10 is a block diagram illustrating an embodiment of a digital radar processing system 100 using autocorrelation processing according to the present invention.

The processing device 1012 in the digital wide-band radar processing system 100 in FIG. 10 is different from the processing devices 212 and 512 in the digital wide-band radar processing system 20 and 50 in FIGS. 2 and 5, respectively, in that the processing device 1012 comprises the autocorrelation block 1013 instead of the power spectrum calculation blocks 215a-215n. The autocorrelation block 1013 and the FFT-block 1014 estimates the autocorrelation spectrum of the undersampled digital radar return waveform $u_{ds}[n]$. This is an alternative to calculating $|U_{ds}(\omega_d)|^2$ as is performed in the processing devices 212 and 512. The autocorrelation spectrum estimation, also referred to as Blackman-Tukey, is described in more detail in, for example, James Tsui—"DIGITAL TECHNIQUES FOR WIDEBAND RECEIVERS", Chapter 5.10, p. 132-134. By using the autocorrelation, it follows that the power spectrum of the undersampled digital radar return waveform $|U_{ds}(\omega_d)|^2$ may be calculated as the Fourier Transform of the autocorrelation, that is, without using the power spectrum calculation blocks 215a-215n, as illustrated in FIGS. 2 and 5.

The processing device 1012 may then, as indicated by block 216 in FIG. 10, calculate and transform said power spectrum of said undersampled digital waveform $|U_{ds}(\omega_d)|^2$ into a ripple frequency domain, $F_{ds}(\Omega_d)$ by using the Fourier transform as described above. The processing device 1012 may be arranged to analyse the ripple frequency power spectrum $F_{ds}(\Omega_d)$ in order to extract radar critical information, such as, for example, detection of a target, the distance to and/or radial velocity of a target. Spikes in the ripple frequency power spectrum $F_{ds}(\Omega_d)$ may be identified, extracted and used for this purpose, as is described in reference to FIGS. 4-9.

It should also be noted that although not shown in FIG. 10, the processing device 1012 may also comprise the blocks 517a-517n illustrated in FIG. 5 for calculating $s_{ds}(\Omega_d, v_d)$ as described above.

Figure 11:
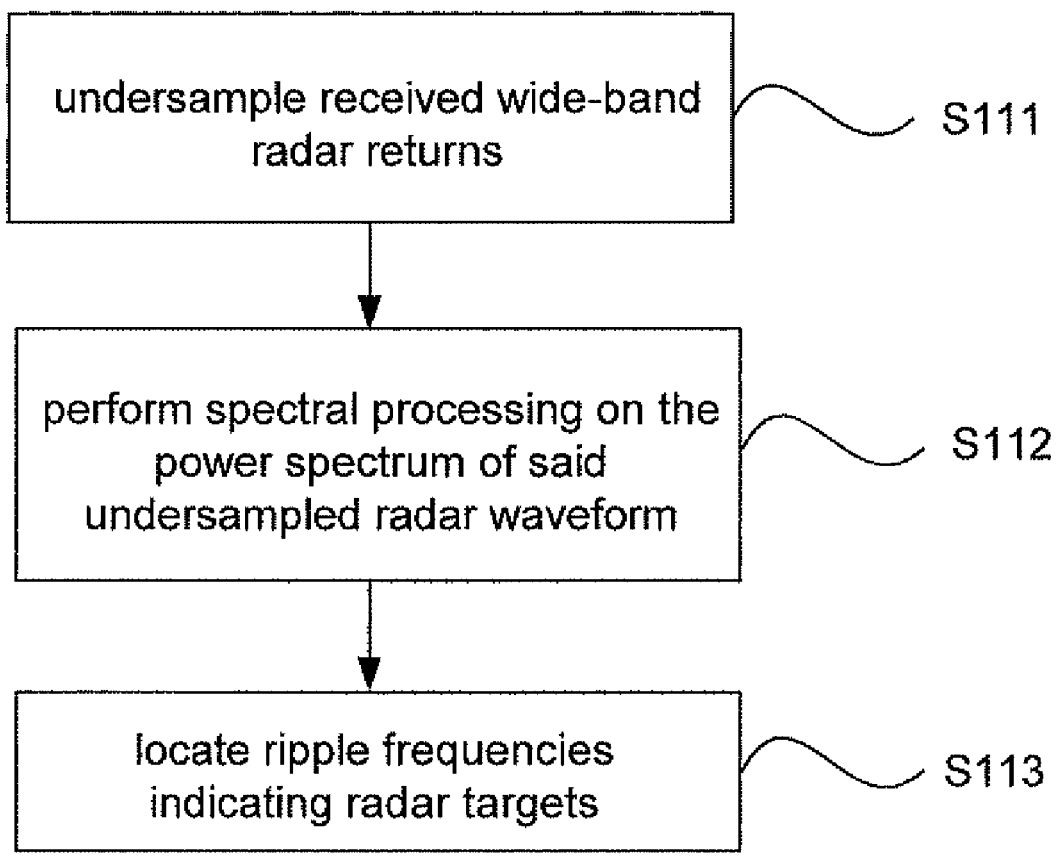
FIG. 11 is a flowchart illustrating a method according to an embodiment of the present invention.

FIG. 11 is a flowchart illustrating a method according to an embodiment of the present invention.

In step S111, the received wide-band radar returns are undersampled by an analog to digital (A/D) converter at a sample frequency far below the Nyquist frequency of the radiated wide-band radar waveform. The selected sampling frequency of the undersampling A/D converter is such that the folding factor in Eq. 12 is stabilized and located or varying within particular acceptable limit values (for example, above 80 MHz in FIG. 3).

In step S112, spectral processing on the power spectrum of the undersampled digital radar waveform $|U_{ds}(\omega_d)|^2$ is performed in order to obtain a discrete ripple frequency power spectrum of the undersampled digital radar waveform $F_{ds}(\Omega_d)$.

In step S113, ripple frequencies in the discrete ripple frequency power spectrum of the undersampled digital radar waveform $F_{ds}(\Omega_d)$ are located. This may be performed as the selected sample frequency of step S111 is selected such that the ripple frequencies remain basically unaffected by the aliasing caused by the undersampling of the undersampling A/D converter. The spectral processing may use double spectral processing or autocorrelation spectrum estimation as previously describe above.

A filter function or the like may be used by the processing device in order to identify spikes in the ripple frequency power spectrum $F_{ds}(\Omega_d)$ since they are readily discernible compared to the rest of the ripple frequencies, as is illustrated in FIG. 4.

The located ripple frequencies in the power spectrum of said undersampled digital waveform may then be used to extract radar target information.

The present invention is also capable of operating in a bi-static configuration in which the digital wide-band radar transmitter and receiver are not positioned at the same location. Furthermore, the digital wide-band radar transmitter does not have to be a part of the digital wide-band radar processing system. The digital wide-band radar receiver may parasitize on other transmitters that may present in its surrounding, for example, transmitters used for television and/or radio transmissions. Some of these transmitters normally use a smooth and flat power spectrum. Such a smooth, flat power spectrum could very well operate as a transmitter for the radar receiver and digital wide-band radar processing system according to the present invention.

The description above is of the best mode presently contemplated for practising the present invention. The description is not intended to be taken in a limiting sense, but is made merely for the purpose of describing the general principles of the invention. The scope of the present invention should only be ascertained with reference to the issued claims.

The invention claimed is:

1. A method for processing received radar returns (u(t)) of a radiated wide-band arbitrary waveform received by a radar receiver in a wide-band radar processing system using spectral processing, the method comprising:
   undersampling said received wide-band radar returns (u(t)) by using a first sampling rate causing a wide frequency band of the received wide-band radar returns (u(t)) to be folded back into a baseband of a undersampling analog-to-digital converter to obtain an undersampled digital wide-band radar waveform ($u_{ds}[n]$);
   performing spectral processing in a processor on the power spectrum of said undersampled digital wide-band radar waveform ($|U_{ds}(\omega_d)|^2$) in order to obtain a discrete ripple frequency power spectrum of said undersampled digital wide-band radar waveform ($F_{ds}(\Omega_d)$); and
   locating, in said discrete ripple frequency power spectrum of said undersampled digital wide-band radar waveform ($F_{ds}(\Omega_d)$), ripple frequencies indicating radar targets using the processor.

2. The method according to claim 1, further comprising:
   extracting at least a first radar target information based on said located ripple frequencies in said discrete ripple frequency power spectrum of said undersampled digital wide-band radar waveform ($F_{ds}(\Omega_d)$), wherein said first radar target information is distances to said radar targets.

3. The method according to claim 1, wherein said first sampling rate is selected such that it is below a second sampling rate, wherein said second sampling rate is the sampling rate required by the wide-band radar returns in order to fulfill a Nyquist criteria, and such that a folding factor present in said discrete ripple frequency power spectrum of said undersampled digital wide-band radar waveform ($F_{ds}(\Omega_d)$) is stable, so that said ripple frequencies may be located in said discrete ripple frequency power spectrum of said undersampled digital wide-band radar waveform ($F_{ds}(\Omega_d)$).

4. The method according to claim 1, further comprising:
   transforming said discrete ripple frequency power spectrum ($F_{ds}(\Omega_d)$) into a velocity domain ($\Im(\Omega_d, v_d)$) using the Fourier transform; and
   extracting a second radar target information from said discrete ripple frequency power spectrum ($F_{ds}(\Omega_d)$) in the velocity domain ($\Im(\Omega_d, v_d)$).

5. The method according to claim 4, wherein said second radar target information is the velocity ($v_d$) of said radar targets.

6. The method according to claim 1, wherein the radiated wide-band arbitrary waveform has a flat frequency spectrum.

7. A radar receiver for processing radar returns in a wide-band radar processing system using spectral processing, the radar receiver comprising:
   a receiver arranged to receive radar returns (u(t)) of wide-band arbitrary waveforms radiated by a transmitter;
   at least one analog to digital converter operating at a first sampling rate arranged to undersample received wide-band radar returns (u(t)) thereby causing a wide frequency band of the received wide-band radar returns (u(t)) to be folded back into a baseband of the analog-to-digital converter to obtain an undersampled digital waveform ($u_{ds}[n]$); and
   a processor arranged to
   perform spectral processing on the power spectrum of said undersampled digital wide-band radar waveform ($|U_{ds}(\Omega_d)|^2$) in order to obtain a discrete ripple frequency power spectrum of said undersampled digital wide-band radar waveform ($F_{ds}(\Omega_d)$), and
   locate, in said discrete ripple frequency power spectrum of said undersampled digital wide-band radar waveform ($F_{ds}(\Omega_d)$), ripple frequencies indicating radar targets.

8. The radar receiver according to claim 7, wherein the radar receiver is arranged to extract at least a first radar target information based on said located ripple frequencies in said discrete ripple frequency power spectrum of said undersampled digital wide-band radar waveform ($F_{ds}(\Omega_d)$), wherein said first radar target information is distances to said radar targets.

9. The radar receiver according to claim 7, wherein said first sampling rate of said at least one analog to digital converter is selected such that it is below a second sampling rate, wherein said second sampling rate is the sampling rate required by the wide-band radar returns in order to fulfill the Nyquist criteria, and such that a folding factor present in said discrete ripple frequency power spectrum of said undersampled digital wide-band radar waveform ($F_{ds}(\Omega_d)$) is stable, so that said ripple frequencies remain may be located in said discrete ripple frequency power spectrum of said undersampled digital wide-band radar waveform ($F_{ds}(\Omega_d)$).

10. The radar receiver according to claim 7, wherein said processor is further arranged to:
    transform said discrete ripple frequency power spectrum ($F_{ds}(\Omega_d)$) into a velocity domain ($\Im(\Omega_d, v_d)$) using the Fourier transform; and
    extract at least a second radar target information from said discrete ripple frequency power spectrum ($F_{ds}(\Omega_d)$) in the velocity domain ($\Im(\Omega_d, v_d)$).

11. The radar receiver according to claim 10, wherein said second radar target information is the velocity ($v_d$) of said radar targets.

12. A digital wide-band radar processing system, comprising:
    a radar receiver comprising
    a receiver arranged to receive radar returns (u(t)) of wide-band arbitrary waveforms radiated by a transmitter,
    at least one analog to digital converter operating at a first sampling rate arranged to undersample received wide-band radar returns (u(t)) thereby causing a wide frequency band of the received wide-band radar returns (u(t)) to be folded back into a baseband of the analog-to-digital converter to obtain an undersampled digital waveform ($u_{ds}[n]$), and
    a processor arranged to
    perform spectral processing on the power spectrum of said undersampled digital wide-band radar waveform ($|U_{ds}(\Omega_d)|^2$) in order to obtain a discrete ripple frequency power spectrum of said undersampled digital wide-band radar waveform ($F_{ds}(\Omega_d)$), and
    locate, in said discrete ripple frequency power spectrum of said undersampled digital wide-band radar waveform ($F_{ds}(\Omega_d)$), ripple frequencies indicating radar targets.

13. A computer program product for use in a radar receiver, said computer program product comprising:
    a computer readable medium; and
    computer readable code recorded on the computer readable medium and executable by a processor which when run in the radar receiver causes said radar receiver to perform the steps of:
    undersampling received wide-band radar returns (u(t)) by using a first sampling rate causing a wide frequency band of the received wide-band radar returns (u(t)) to be folded back into a baseband of a undersampling analog-to-digital converter to obtain an undersampled digital wide-band radar waveform ($u_{ds}[n]$);

performing spectral processing on the power spectrum of said undersampled digital wide-band radar waveform ($|U_{ds}(\omega_d)|^2$) in order to obtain a discrete ripple frequency power spectrum of said undersampled digital wide-band radar waveform ($F_{ds}(\Omega_d)$); and locating, in said discrete ripple frequency power spectrum of said undersampled digital wide-band radar waveform ($F_{ds}(\Omega_d)$), ripple frequencies indicating radar targets.

14. The computer program product for use in a radar receiver according to claim 13, wherein the computer readable code is further for performing the step of:

extracting at least a first radar target information based on said located ripple frequencies in said discrete ripple frequency power spectrum of said undersampled digital wide-band radar waveform ($F_{ds}(\Omega_d)$).

* * * * *